United States Patent
Eller et al.

(10) Patent No.: US 8,985,501 B2
(45) Date of Patent: Mar. 24, 2015

(54) VIBRATION CONTROL SYSTEM

(75) Inventors: Erez Eller, Oakville, CT (US); Todd A. Garcia, Mansfield, TX (US)

(73) Assignee: Sikorsky Aircraft Corporation, Stratford, CT (US)

( * ) Notice: Subject to any disclaimer, the term of this patent is extended or adjusted under 35 U.S.C. 154(b) by 271 days.

(21) Appl. No.: 13/347,249

(22) Filed: Jan. 10, 2012

(65) Prior Publication Data

US 2012/0181377 A1    Jul. 19, 2012

Related U.S. Application Data

(60) Provisional application No. 61/432,847, filed on Jan. 14, 2011.

(51) Int. Cl.
  *B64C 27/82* (2006.01)
  *B64C 27/00* (2006.01)
  *F16F 15/14* (2006.01)

(52) U.S. Cl.
  CPC ........... *B64C 27/001* (2013.01); *F16F 15/1485* (2013.01); *B64C 2027/005* (2013.01)
  USPC ...................................... 244/17.19

(58) Field of Classification Search
  USPC .................... 244/17.19, 17.13; 267/292, 293, 267/140.12, 141.2
  See application file for complete search history.

(56) References Cited

U.S. PATENT DOCUMENTS

| | | | | |
|---|---|---|---|---|
| 3,188,884 A | * | 6/1965 | Bancroft | 74/665 K |
| 4,534,524 A | * | 8/1985 | Aldrich | 244/17.25 |
| 4,632,337 A | * | 12/1986 | Moore | 244/17.19 |
| 4,783,023 A | * | 11/1988 | Jupe | 244/6 |
| 4,854,561 A | * | 8/1989 | Kanda | 267/140.12 |
| 4,896,868 A | * | 1/1990 | Thelamon et al. | 267/140.12 |
| 6,102,380 A | * | 8/2000 | Tsutsumida | 267/140.12 |
| 6,318,708 B1 | * | 11/2001 | Wolf et al. | 267/140.12 |
| 7,780,153 B2 | * | 8/2010 | Haubrich et al. | 267/140.13 |
| 8,297,602 B2 | * | 10/2012 | Kojima et al. | 267/140.12 |

* cited by examiner

*Primary Examiner* — Timothy D Collins
*Assistant Examiner* — Keith L Dixon
(74) *Attorney, Agent, or Firm* — Cantor Colburn LLP

(57) ABSTRACT

A vibration control system includes four mass discs located at a central axis and rotatable thereabout. Each mass disc includes a mass secured thereto wherein rotation of the four mass discs creates a vibratory force output. A power transfer assembly is located between adjacent mass discs of the four mass discs and is configured to transfer rotational energy between the adjacent mass discs. The power transfer assembly includes a power transfer shaft rotatable about a power transfer shaft axis and a power transfer disc connected to the power transfer shaft and in frictional contact with each of the adjacent mass discs at a contact point. When the power transfer shaft is rotated, a radial location of the contact point at each of the adjacent mass discs relative to the central axis is changed, altering the vibratory force.

18 Claims, 6 Drawing Sheets

VIBRATION CONTROL SYSTEM

CROSS REFERENCE TO RELATED APPLICATIONS

This application claims priority to U.S. provisional application 61/432,847 filed Jan. 14, 2011, the entire contents of which are incorporated herein by reference.

BACKGROUND OF THE INVENTION

The subject matter disclosed herein relates to vibration cancellation systems for, for example, rotary wing aircraft.

Rotating machinery commonly produces vibration. Rotary wing aircraft, for example, are susceptible to vibration even with correctly balanced and tracked components, such as rotors. This is due, at least in part, to oscillatory aerodynamic loading which produces forces and moments of vibratory load along three axes (X,Y,Z) which are generated by the rotor at the blade passing frequency. The forces and moments are usually transmitted through the shaft, aircraft transmission, and into the airframe via transmission attachments to produce vibration in the airframe. The goal of vibration cancellation is to reduce vibration to an acceptable level for occupant comfort and component reliability.

One typical approach to reducing such vibration involves replacing a rigid gearbox mounting strut with a compliant strut and parallel hydraulic actuator. Such an arrangement intercepts the vibration of the gearbox before the vibration is transferred to the airframe, and/or it generates counteracting loads to partially suppress the vibration. Interruption of the load path between the gear box and the airframe may cause fatigue failures in engine drive shafts which transmit power to the gear box.

Another conventional approach utilizes counter-rotating eccentric masses located in the airframe to rotate at the frequency of the aircraft vibration. A second pair of eccentric masses phased relative to the first pair to yield a force magnitude from zero to maximum force. Rotation of the masses is controlled to counter the vibratory forces entering the airframe from the gearbox. Typical force generators are driven by sizeable electric motors and since each unit can counteract one of the six moments and forces driving the vibration, six such units are required to have full vibration control capability.

The art would well-receive an improved, more compact vibration cancellation system for a rotary wing aircraft.

BRIEF DESCRIPTION OF THE INVENTION

According to one aspect of the invention, a vibration control system includes four mass discs located at a central axis and rotatable thereabout. Each mass disc includes a mass secured thereto wherein rotation of the four mass discs creates a vibratory force output. A power transfer assembly is located between adjacent mass discs of the four mass discs and is configured to transfer rotational energy between the adjacent mass discs. The power transfer assembly includes a power transfer shaft rotatable about a power transfer shaft axis and a power transfer disc connected to the power transfer shaft and in frictional contact with each of the adjacent mass discs at a contact point. When the power transfer shaft is rotated about the power transfer shaft axis, a radial location of the contact point at each of the adjacent mass discs relative to the central axis is changed thereby altering the vibratory force output.

According to another aspect of the invention, a rotary wing aircraft includes an airframe, a rotor mounted to the airframe, one or more engines operably connected to the rotor via a gearbox for driving rotation of the rotor, and one or more vibration control systems operably connected to the gearbox. Each vibration control system includes four mass discs located at a central axis and rotatable thereabout. Each mass disc includes a mass secured thereto wherein rotation of the four mass discs creates a vibratory force output. A power transfer assembly is located between adjacent mass discs of the four mass discs and is configured to transfer rotational energy between the adjacent mass discs. The power transfer assembly includes a power transfer shaft rotatable about a power transfer shaft axis and a power transfer disc connected to the power transfer shaft and in frictional contact with each of the adjacent mass discs at a contact point. When the power transfer shaft is rotated about the power transfer shaft axis, a radial location of the contact point at each of the adjacent mass discs relative to the central axis is changed thereby altering the vibratory force output.

According to yet another aspect of the invention, a method for controlling vibration of an airframe of a rotary wing aircraft includes locating one or more vibration control systems in operable communication with a gearbox of the rotary wing aircraft. Each vibration control system includes four mass discs located at a central axis and rotatable thereabout the shaft, each mass disc including a mass secured thereto. A power transfer assembly is located between adjacent mass discs of the four mass and includes a power transfer shaft rotatable about a power transfer shaft axis, and a power transfer disc connected to the power transfer shaft and in frictional contact with each of the adjacent mass discs at a contact point. An operable connection to the gearbox drives rotation of a first mass disc of the four mass discs about the central axis via an operable connection to the gearbox and rotational energy is transferred from the first mass disc to a second mass disc of the four mass discs via the power transfer disc disposed between adjacent mass discs to generate a vibratory force. The power transfer shaft is rotated about the power transfer shaft axis, thus moving the contact point at the first mass disc to a radial position different than the contact point at the second mass disc, and changing a rotational speed of the second mass disc relative to a rotational speed of the first mass disc to alter the vibratory force.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
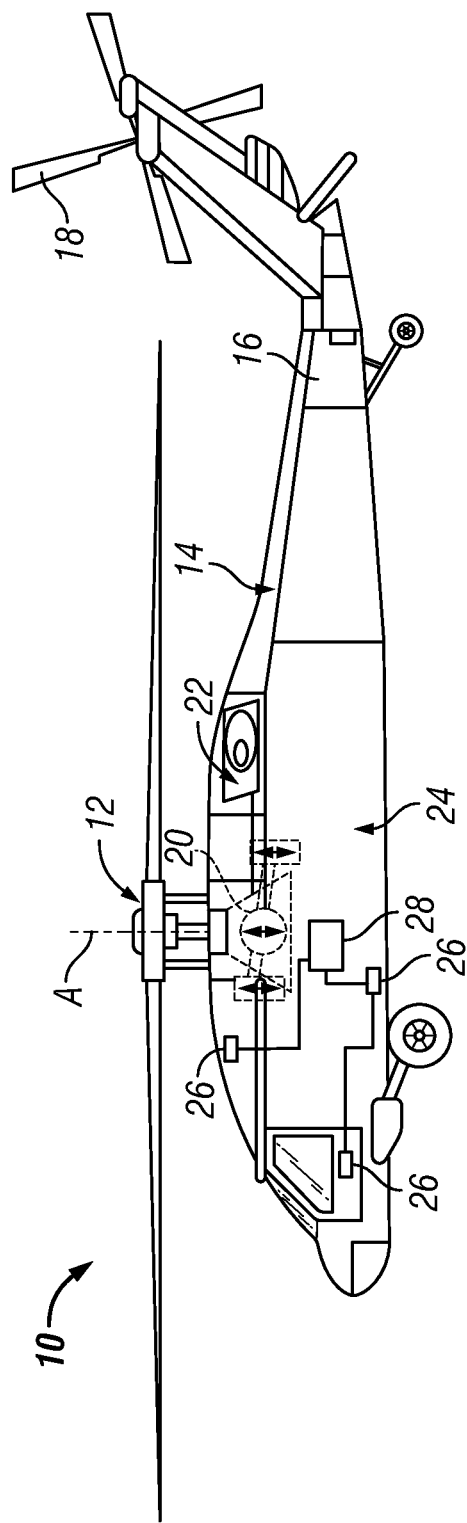
FIG. 1 is a schematic illustration of an embodiment of a rotary wing aircraft.

Shown in FIG. 1 is a schematic illustration of a rotary wing aircraft 10 having a main rotor assembly 12. The aircraft 10 includes an airframe 14 having an extending tail 16 at which is mounted an anti-torque rotor 18. Although the configuration illustrated is a helicopter, it is to be appreciated that other machines such as turbo-props and tilt-wing aircraft will also benefit from the system of the present disclosure. The main rotor assembly 12 is driven through a main rotor gearbox 20 by one or more engines 22. Vibrations from the main rotor assembly 12, the gearbox 20 and the engines 22 are transmitted to the airframe 14 via, in some instances, the gearbox 20 which is rigidly mounted to the airframe 14.

A vibration control system 24 is mounted to the airframe 14, and is powered by the gearbox 20. The vibration control system 24 is configured to counter and/or reduce vibratory forces transmitted to the airframe 14 by the gearbox 20. A plurality of sensors 26 are mounted at various locations throughout the aircraft 10, for example, at or near the cockpit and/or passenger cabin locations. In some embodiments, the sensors 26 are accelerometers which communicate with a processor 28 which generates output signals to control operation of the vibration control system 24.

Figure 2:
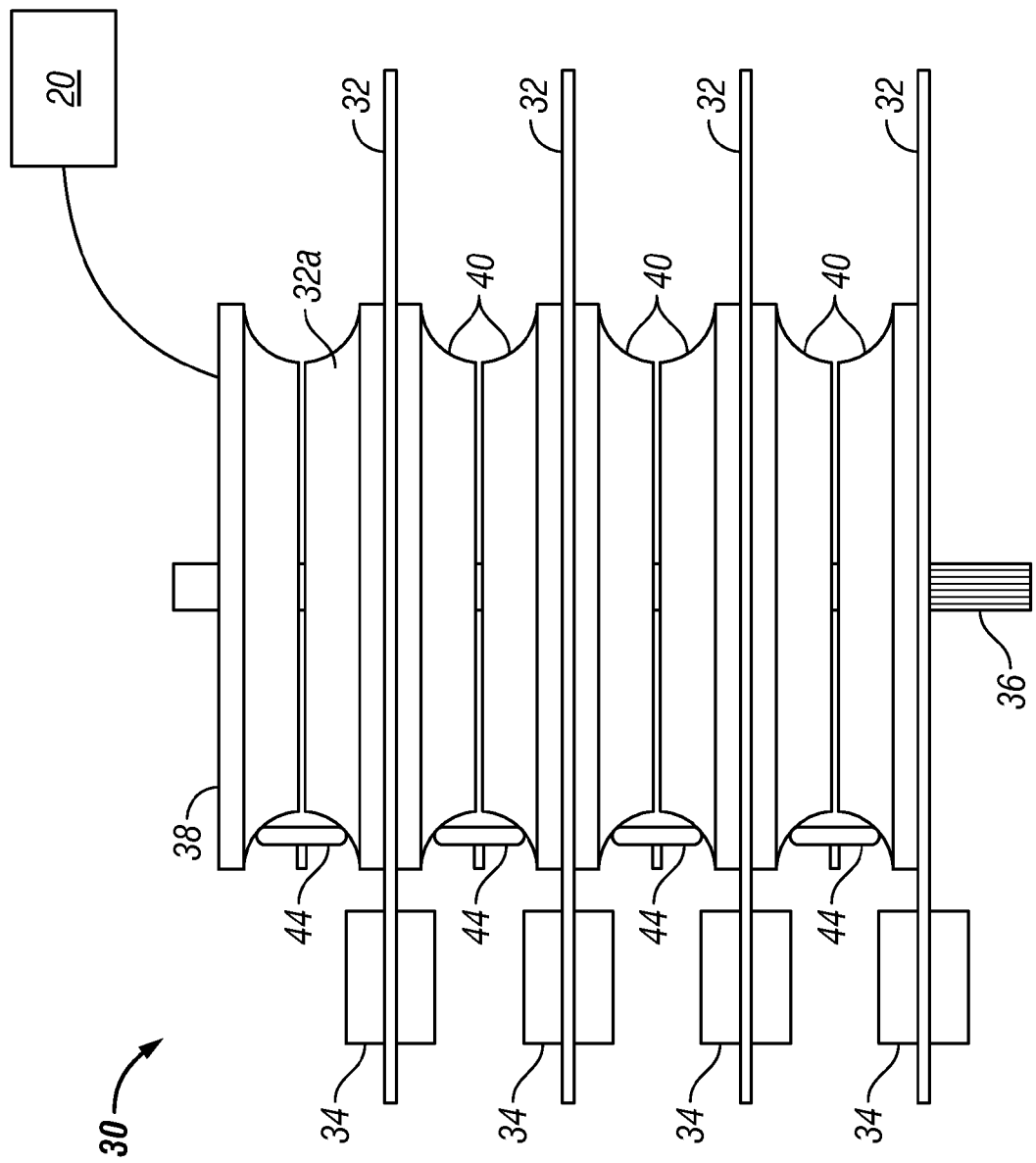
FIG. 2 is a schematic view of an embodiment of a force generator.

Referring now to FIG. 2, the vibration control system 24 includes a plurality of force generators 30. One force generator 30 is shown in FIG. 2 and described herein, but it is to be appreciated that additional force generators 30 included in the vibration control system 24 are substantially the same as the force generator 30 shown and described. Each force generator 30 includes a plurality of eccentric mass discs 32 supportive of a mass 34 and arranged along a central shaft 36 having a central axis 62. For example, an embodiment with four mass discs 32 is shown in FIG. 2. A first mass disc 32a of the plurality of mass discs 32 is operably connected to the gearbox 20 via, for example a transfer gear 38 to drive rotation of the first mass disc 32a about the shaft 36.

Figure 3:
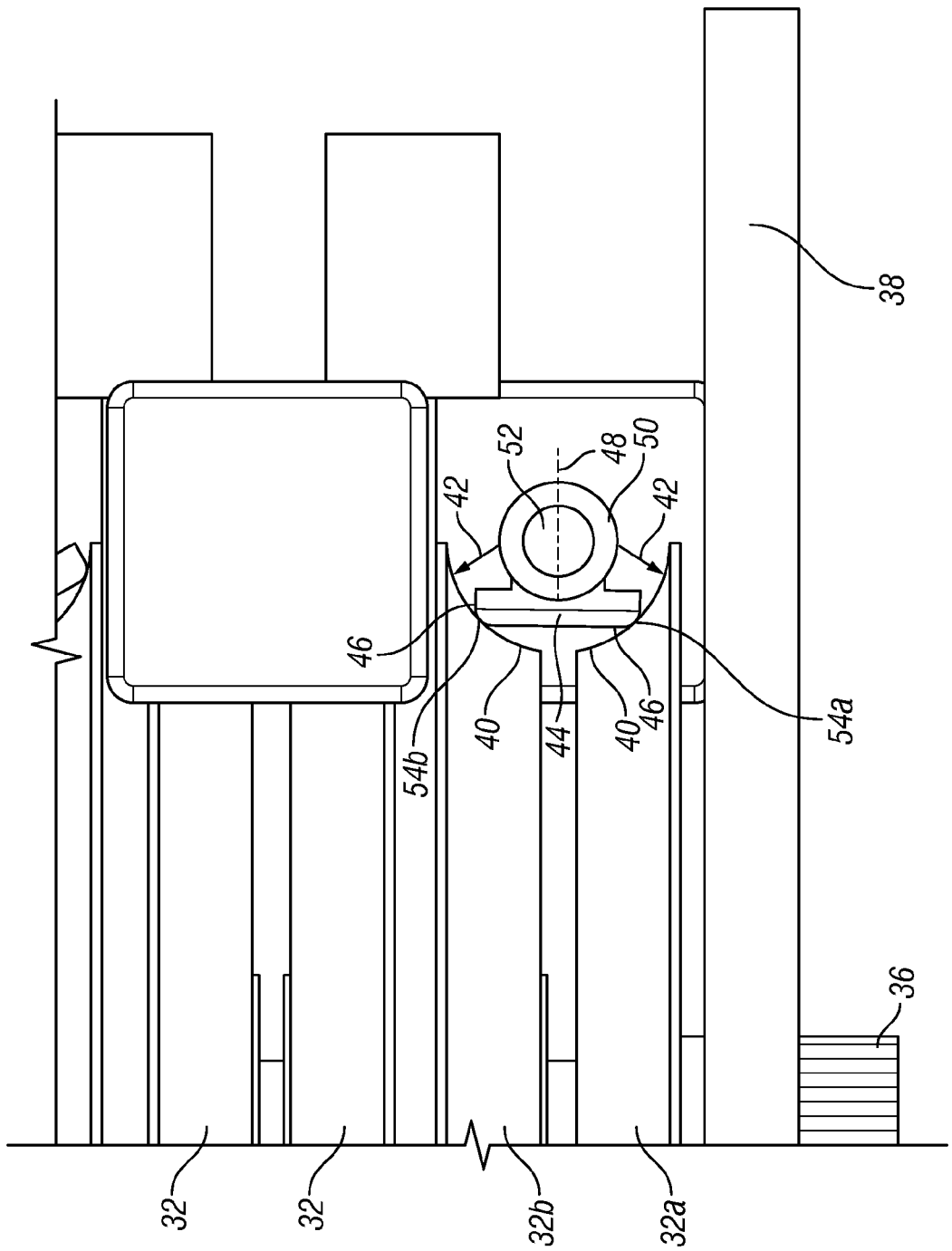
FIG. 3 is a partial view of an embodiment of a force generator.

The mass discs 32 are stacked substantially concentrically along the shaft 36 and rotate freely thereon. Referring now to FIG. 3, the mass discs 32 include a concave outboard surface 40. The outboard surface 40 may be of a constant radius 42, or other shape as desired. A power transfer disc (PTD) 44 is located between each pair of adjacent mass discs 32 and is configured such that an outer surface 46 of the PTD 44 contacts the outboard surface 40 of each mass disc 32. The PTD 44 is rotatable about a PTD central axis 48. The PTD 44 is supported in position between the adjacent mass discs 32 by, for example, a torque shaft 50, which is rotatable about a torque shaft axis 52. The PTD 44 transfers rotational energy between adjacent mass discs 32, for example first mass disc 32a and second mass disc 32b. The PTD 44 is frictionally engaged to the first mass disc 32a and the second mass disc 32b at contact points 54a and 54b, respectively. Rotation of the first mass disc 32a about the shaft 36 in a first direction 56 drives rotation of the PTD 44 about the PTD central axis 48. The rotation of the PTD 44 about the PTD central axis 48 drives rotation of the second mass disc 32b about the shaft 36 in a second direction 58 opposite the first direction 56. Similarly, the remaining PTDs 44 transfer rotational energy between adjacent mass discs 32, also in a counter-rotating manner. The counter-rotation of the mass discs 32 creates a vibratory force at a location at which the force generator 30 is attached to the aircraft 10. By altering the phasing of the vibratory forces at different locations, vibratory moments are generated. The combination of these forces and moments compensate for aircraft vibration.

Figure 4:
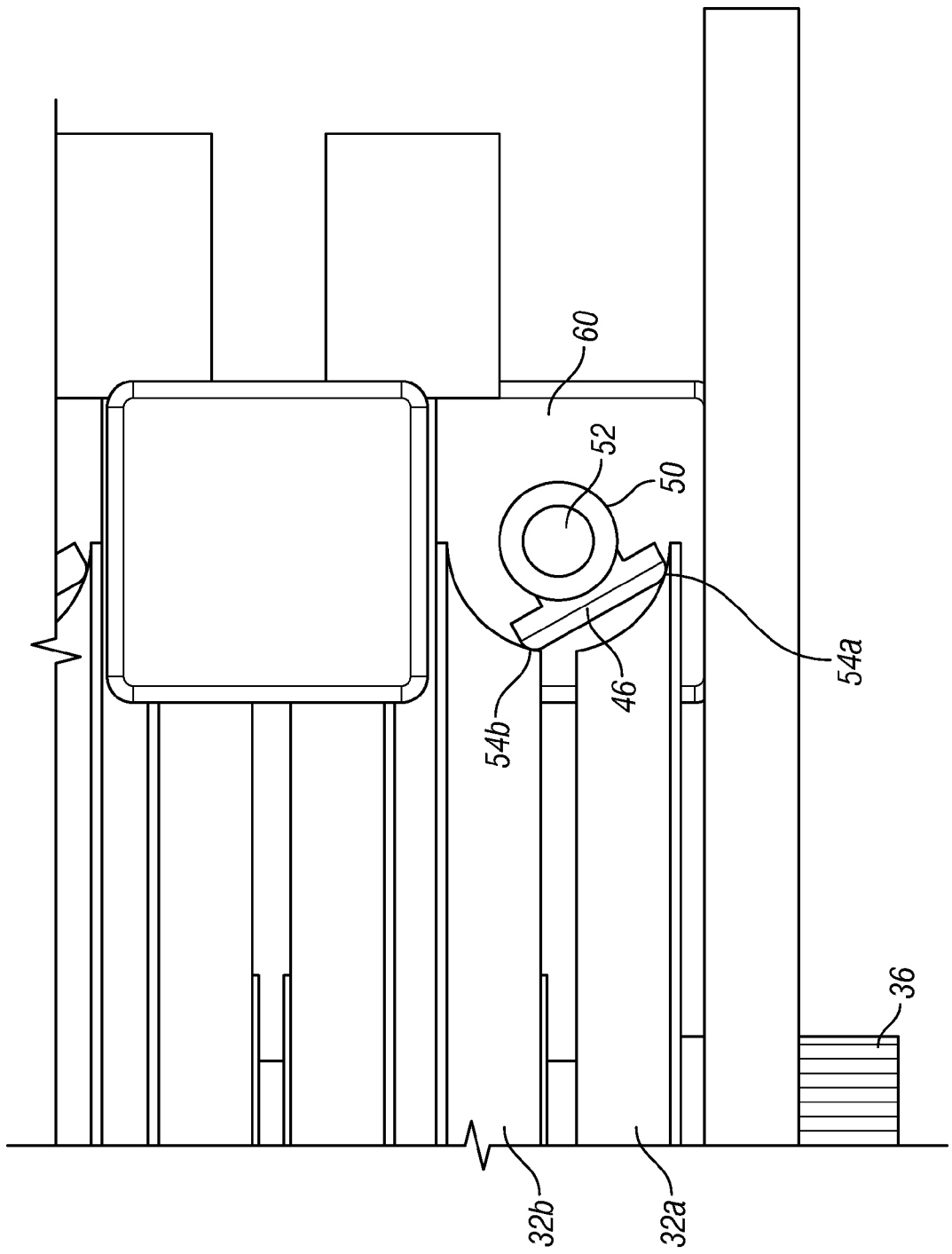
FIG. 4 is another partial view of an embodiment of a force generator.
Figure 5:
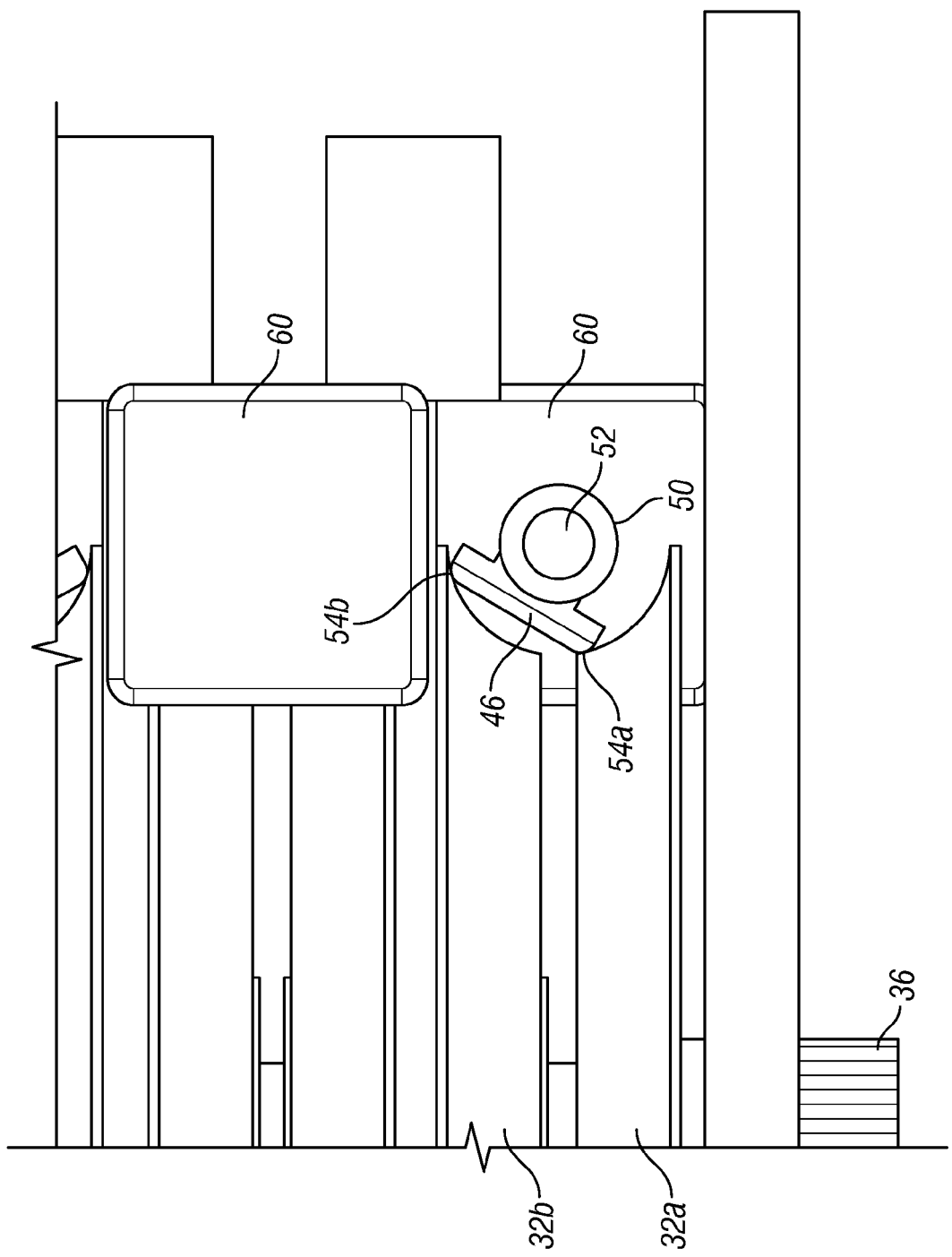
FIG. 5 is yet another partial schematic view of an embodiment of a force generator.

When the PTD 44 is positioned such that the contact points 54a and 54b are at equal distances from the shaft 36 as shown in FIG. 3, the rotational speeds of mass discs 32a and 32b are substantially equal. As shown in FIGS. 4 and 5, the PTD 44 is fixed to the torque shaft 50 such that rotation of the torque shaft 50 about the torque shaft axis 52 translates into movement of the PTD 44 about the torque shaft axis 52. When the torque shaft 50 is rotated about the torque shaft axis 52, the contact points 54a and 54b shift location inboard or outboard on the mass discs 32a and 32b, changing the relative rotational speeds of mass discs 32a and 32b. Referring to FIG. 4, when the torque shaft 50 is rotated counter-clockwise, the contact point 54a on the first mass disc 32a moves radially outwardly and the contact point 54b on the second mass disc 32b is moved radially inwardly. As a result, the rotational speed of the second mass disc 32b is increased relative to the rotational speed of the first mass disc 32a. Similarly, as shown in FIG. 5, when the torque shaft 50 is rotated clockwise, the contact point 54a on the first mass disc 32a moves radially inwardly and the contact point 54b on the second mass disc 32b is moved radially outwardly. As a result, the rotational speed of the second mass disc 32b is decreased relative to the rotational speed of the first mass disc 32a.

Since the PTD's 44 are able to change the relative velocities of the four mass discs 32, the relative phasing of the four mass discs 32 is also changeable. By altering the phasing of the mass discs 32, the amplitude, azimuth, frequency and phasing of the generated force, relative to the aircraft vibratory forces, are all adjustable. With the rotational speed of each mass disc 32 being independently controlled, a force generator 30 having four mass discs 32 is capable of generating a force in any direction normal to the shaft, as well as rotating forces in either direction about the axis of the central shaft 36, as opposed to a single axial force of prior art force generators. Thus, to generate the six forces and moments to cancel aircraft vibration, only three force generators 30 are necessary as opposed to six prior art force generators.

Figure 6:
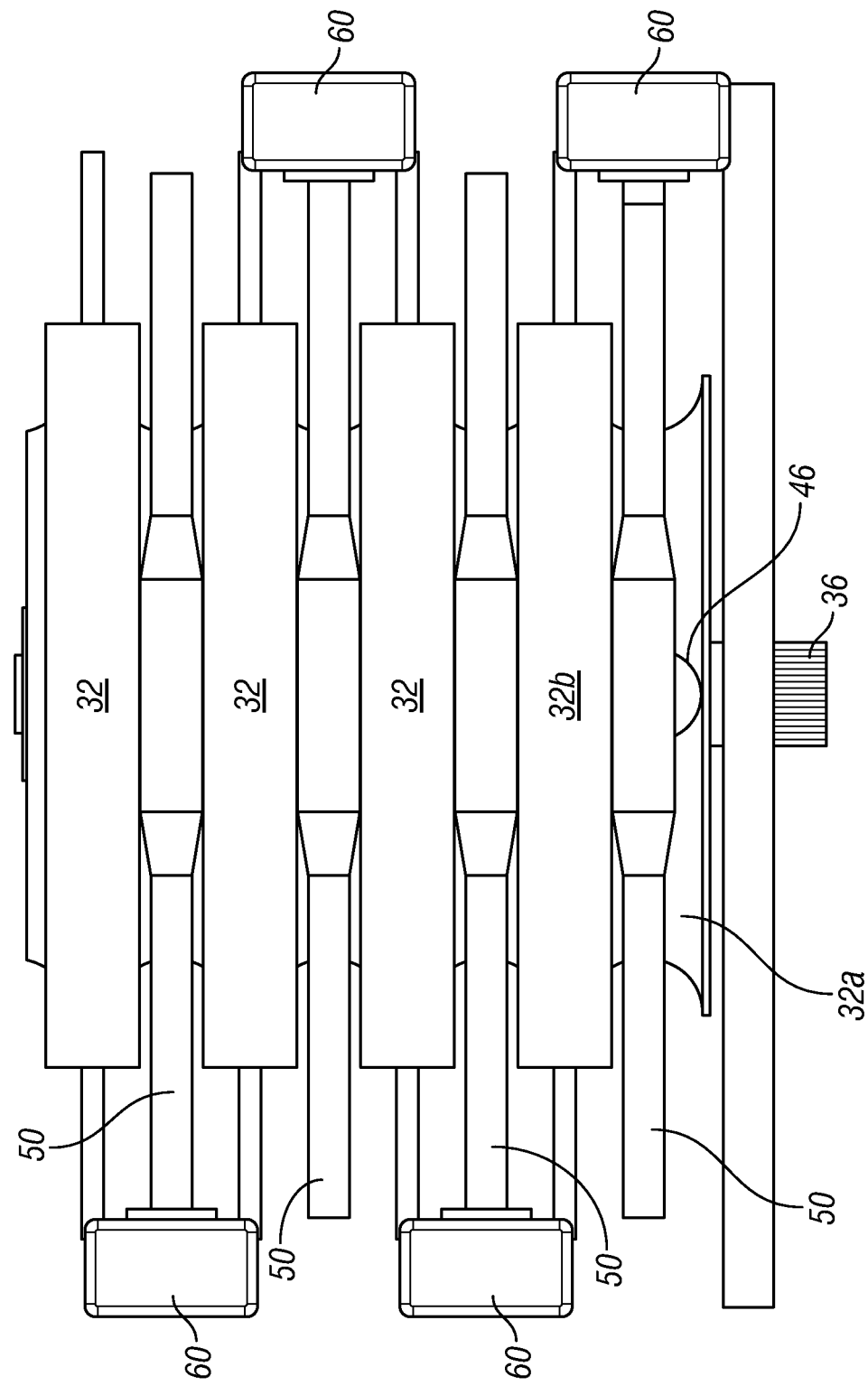
FIG. 6 is another schematic view of an embodiment of a force generator.

Referring to FIG. 6, each torque shaft 50 is connected to an actuator 60 which rotates the torque shaft 50 about the torque shaft axis 52. In some embodiments, the actuator 60 is a stepper motor, but it is to be appreciated that other types of actuators 60, including electrical actuators, piezo, or bio-wire may be utilized. The actuators 60 are operably connected to the processor 28 and receive-instruction from the processor 28 based on data from the plurality of sensors 26 regarding aircraft vibratory forces. In some embodiments, each actuator includes an electric generator and an electronic control system integral thereto to drive the PTD's 44.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A vibration control system comprising:
   four mass discs disposed at a central axis and rotatable thereabout, each mass disc including a mass secured thereto wherein rotation of the four mass discs creates a vibratory force output; and
   a power transfer assembly disposed between adjacent mass discs of the four mass discs and configured to transfer rotational energy between the adjacent mass discs including:
      a power transfer shaft rotatable about a power transfer shaft axis; and
      a power transfer disc connected to the power transfer shaft and in frictional contact with each of the adjacent mass discs at a contact point, wherein when the power transfer shaft is rotated about the power transfer shaft axis, a radial location of the contact point at each of the adjacent mass discs relative to the central axis is changed thereby altering the vibratory force output;
   wherein each mass disc of the four mass discs includes a concave recess wherein the contact point is disposed.

2. The vibration control system of claim 1, wherein the power transfer disc is configured such that rotation of the power transfer shaft moves a radial location of a first contact point at a first mass disc radially outwardly from the central axis and moves a radial location of a second contact point at a second mass disc radially inwardly toward the central axis.

3. The vibration control system of claim 1, wherein the concave recess has a circular cross-sectional shape.

4. The vibration control system of claim 1, further comprising an actuator operably connected to the power transfer shaft.

5. The vibration control system of claim 4, wherein the actuator is a stepper motor.

6. The vibration control system of claim 4, wherein the vibration control system includes an electric generator operably connected to the actuator.

7. The vibration control system of claim 1 wherein a first mass disc of the four mass discs is operably connectable to the gearbox of a rotary wing aircraft.

8. A rotary wing aircraft comprising:
   an airframe;
   a rotor mounted to the airframe;
   one or more engines operably connected to the rotor via a gearbox for driving rotation of the rotor; and
   one or more vibration control systems operably connected to the gearbox, each vibration control system including:
      four mass discs disposed at a central axis and rotatable thereabout, each mass disc including a mass secured thereto wherein rotation of the four mass discs creates a vibratory force output; and
      a power transfer assembly disposed between adjacent mass discs of the four mass discs and configured to transfer rotational energy between the adjacent mass discs including:
         a power transfer shaft rotatable about a power transfer shaft axis; and
         a power transfer disc connected to the power transfer shaft and in frictional contact with each of the adjacent mass discs at a contact point, wherein when the power transfer shaft is rotated about the power transfer shaft axis, a radial location of the contact point at each of the adjacent mass discs relative to the central axis is changed thereby altering the vibratory force output;
      wherein each mass disc of the four mass discs includes a concave recess wherein the contact point is disposed.

9. The rotary wing aircraft of claim 8, wherein the power transfer disc is configured such that rotation of the power transfer shaft moves a radial location of a first contact point at a first mass disc radially outwardly from the central axis and moves a radial location of a second contact point at a second mass disc radially inwardly toward the central axis.

10. The rotary wing aircraft of claim 8, wherein the concave recess has a circular cross-sectional shape.

11. The rotary wing aircraft of claim 8, further comprising an actuator operably connected to the power transfer shaft.

12. The rotary wing aircraft of claim 11, wherein the actuator is a stepper motor.

13. The rotary wing aircraft of claim 11, wherein the vibration control system includes an electric generator operably connected to the actuator.

14. The rotary wing aircraft of claim 8, wherein the one or more vibration control systems is three vibration control systems.

15. A method for controlling vibration of an airframe of a rotary wing aircraft comprising:
   disposing one or more vibration control systems in operable communication with a gearbox of the rotary wing aircraft, each vibration control system including:
      four mass discs disposed at a central axis and rotatable thereabout, each mass disc including a mass secured thereto; and
      a power transfer assembly disposed between adjacent mass discs of the four mass discs including:
         a power transfer shaft rotatable about a power transfer shaft axis; and
         a power transfer disc connected to the power transfer shaft and in frictional contact with each of the adjacent mass discs at a contact point;
      wherein each mass disc of the four mass discs includes a concave recess wherein the contact point is disposed;
   driving rotation of a first mass disc of the four mass discs about the central axis via an operable connection to the gearbox;
   transferring rotational energy from the first mass disc to a second mass disc of the four mass discs via the power transfer disc disposed between the mass discs to generate a vibratory force; and
   rotating the power transfer shaft about the power transfer shaft axis; and
   moving a first contact point at the first mass disc to a radial position different than a second contact point at the second mass disc, thereby changing a rotational speed of the second mass disc relative to a rotational speed of the first mass disc to alter the vibratory force.

16. The method of claim 15, further comprising:
   transferring rotational energy from the second mass disc to a third mass disc of the four mass discs via a second power transfer disc disposed therebetween;
   transferring rotational energy from the third mass disc to a fourth mass disc of the four mass discs via a third power transfer disc disposed therebetween; and
   rotating the second power transfer disc and/or the third power transfer discs about their respective power transfer shaft axes to alter the vibratory force.

17. The method of claim 15, further comprising:
   disposing an actuator in operable communication with the power transfer shaft; and activating the actuator to drive rotation of the power transfer shaft about the power transfer shaft axis.

18. The method of claim 15, further comprising rotating the power transfer shaft in response to vibration data acquired from one or more sensors disposed in the aircraft.

* * * * *